(No Model.) 2 Sheets—Sheet 1.

A. STEIERT.
CAR FENDER.

No. 555,292. Patented Feb. 25, 1896.

Witnesses:
Thomas M. Smith
Richard C. Maxwell

Inventor:
Albert Steiert,
By J. Walter Douglass
Attorney.

(No Model.)
A. STEIERT.
CAR FENDER.
No. 555,292. Patented Feb. 25, 1896.
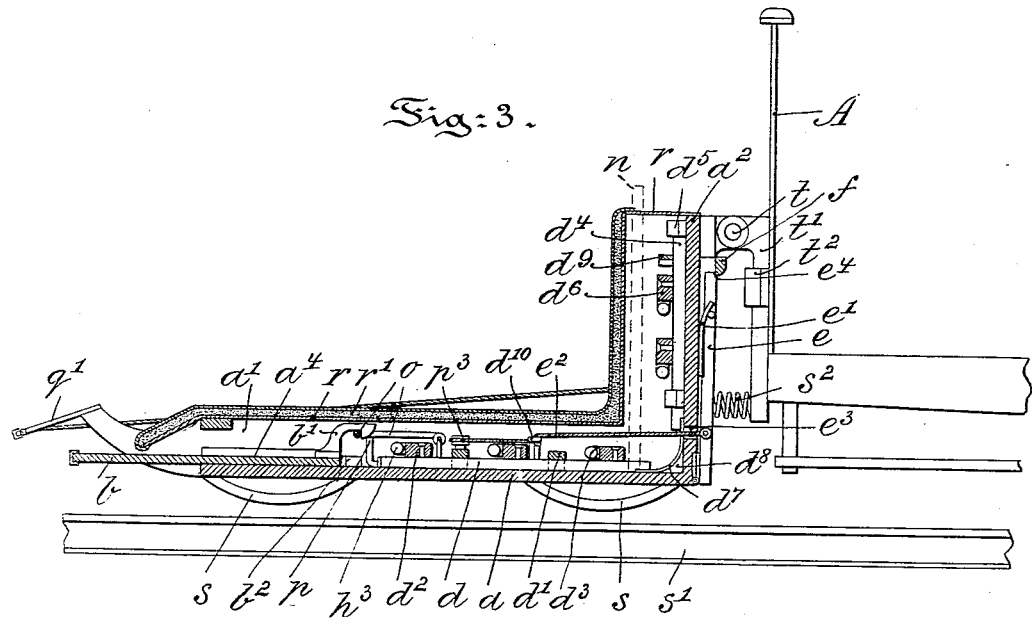
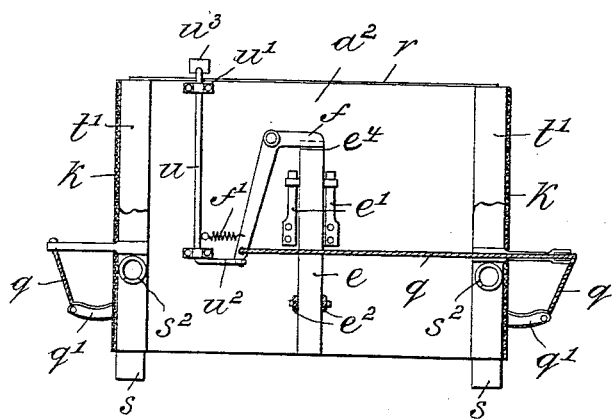
Witnesses:
Thomas M. Smith
Richard C. Maxwell
Inventor:
Albert Steiert,
By J. Walter Douglass
Attorney.

UNITED STATES PATENT OFFICE.

ALBERT STEIERT, OF PHILADELPHIA, PENNSYLVANIA.

CAR-FENDER.

SPECIFICATION forming part of Letters Patent No. 555,292, dated February 25, 1896.

Application filed December 12, 1895. Serial No. 571,857. (No model.)

*To all whom it may concern:*

Be it known that I, ALBERT STEIERT, a subject of the Emperor of Germany, residing at the city of Philadelphia, in the county of Philadelphia and State of Pennsylvania, have invented certain new and useful Improvements in Car-Fenders, of which the following is a specification.

My invention has relation to a car-fender of the type which may be extensible in either a longitudinal or transverse direction, and in such direction it relates particularly to the construction and arrangement of such a car-fender.

The principal objects of my invention are, first, to provide a car-fender adapted to prevent a person from being thrown under the wheels or platform of a car, whether the person be struck by the front or sides of the fender; second, to provide in such a fender wings adapted to be locked normally to the sides of the fender-frame and to be sprung outward from said sides when the fender strikes an obstruction either at the side or front of the fender; third, to provide in such a fender wings adapted to be locked normally to the sides and front of the fender-frame and to be extended outward therefrom when the fender meets an obstruction, and, fourth, to provide in such a fender a locking-lever and catch adapted to lock the wings to the frame and a chain or cord connected with the catch and adapted to release the locking-lever, said chain or cord extending in front of and around the sides and front of the fender-frame.

My invention, stated in general terms, consists of a car-fender constructed and arranged in the manner substantially as hereinafter described and claimed.

The nature and scope of my invention will be more fully understood from the following description, taken in connection with the accompanying drawings, forming part hereof, and in which—

Figure 1:
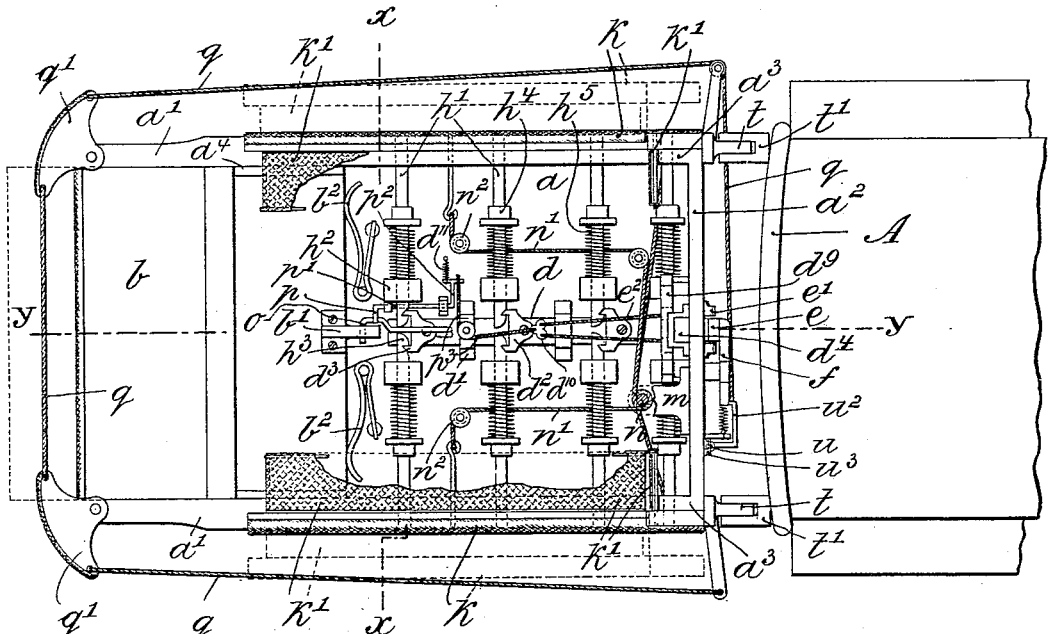
Figure 2:
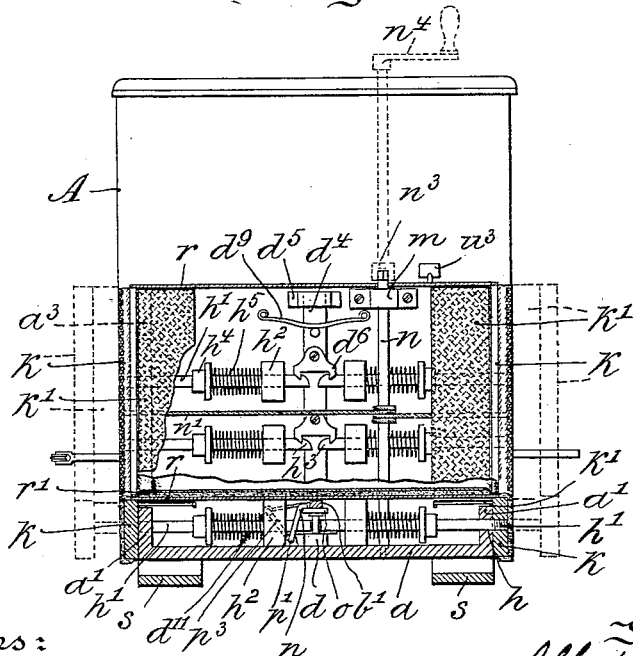

Figure 1 is a top or plan view of the fender attached to the dashboard of a car, embodying the main features of my invention, the top cover or cushion thereof being removed to more clearly illustrate the mechanism for locking and operating the side and front extensions or wings of the fender, the positions assumed by said extensions being indicated in full and dotted lines. Fig. 2 is a transverse section taken on the line $x$ $x$ of Fig. 1 and illustrating the arrangement and construction of the locking-bar for the extensions. Fig. 3 is a longitudinal central section taken on the line $y$ $y$ of Fig. 1, the fender being provided with its top cover or cushion, and illustrating the method of securing the fender to the dashboard of the car; and Fig. 4 is a rear elevation of the fender removed from the car and illustrating the lever and catch operating the locking-bar and the connection of the chain or cord to the catch adapted to release the same.

Referring to the drawings, $a$ represents the bottom frame or floor of the fender, at the sides of which are secured the side frames $a'$, and at the rear end the upright frame $a^2$, which is placed adjacent to the dashboard A of the car. The upright frame $a^2$ is provided with side pieces $a^3$, forming a continuation of the side frames $a'$. The front end of the side frames $a'$ are longitudinally slotted, as at $a^4$, to serve as guides or slots for the front extension or wing $b$, which moves back and forth therein substantially as hereinafter explained. At approximately the longitudinal center of the floor $a$ is placed the horizontal locking-bar $d$, which is adapted to move longitudinally on the floor $a$, being guided in its movement by one or more guides $d'$, integral with or projecting upward from the floor. This locking-bar $d$ is provided with preferably three brackets $d^2$, each of which carries at the sides of its forward end a hook-shaped locking projection $d^3$.

On the vertical or upright frame $a^2$, and in alignment with the locking-bar $d$, is mounted the vertical locking-bar $d^4$, which slides on the frame $a^2$ through guides $d^5$, in a manner similar to the movement of the locking-bar $d$. This vertical locking-bar $d^4$ is also provided with hook-shaped projections $d^6$, arranged substantially in the same manner as are the projections $d^3$ of the bar $d$. The two locking-bars $d^4$ and $d$ are connected together near the floor $a$ by means of a curved bracket $d^7$, which, as shown in the drawings, may consist simply of a thin metal plate curved to required form. This bracket or plate $d^7$ rests on a concave support $d^8$, formed at the angle between the floor $a$ and the upright frame $a^2$, and when the bars $d^4$ or $d$ are moved, this plate $d^7$ moves correspondingly upon its support $d^8$. The vertical locking-bar $d^4$ is normally held in its lowest position by means of a spring $d^9$, and by reason of the bracket or plate $d^7$ the horizontal locking-bar $d^4$ is, by means of said spring $d^9$, thrown toward the forward end of the frame $a$, which position, as hereinafter explained, is the locking position of the bars $d^4$ and $d$.

The vertical locking-bar $d^4$ is elevated and sustained in its upper position and the horizontal bar $d$ is held in its inward position toward the upright frame $d^2$ by means of the following mechanism: On the outside of the upright $a^2$ and at the lower end thereof is pivoted or hinged a lever-arm $e$, normally thrown inward toward the dashboard A by means of the leaf-springs $e'$, one end of which is secured to the upright $a^2$, while the other end rests against the lever-arm $e$. This lever-arm $e$ is connected to an eye $d^{10}$, secured to the horizontal locking-bar $d$ by means of a chain or cord $e^2$, in such a manner that when the lever-arm is thrown by its springs $e'$ the chain or cord will retract the locking-bar $d$ and through the curved plate $d^7$ elevate the vertical locking-bar $d^4$ against the tension of its spring $d^9$. The cord or chain $e^2$ passes through a suitable opening $e^3$ in the upright $a^2$.

The upper end of the lever-arm $e$ is slightly beveled, as at $e^4$, at its upper end, and when pressed toward the upright $a^2$, against the tension of the springs $e'$, the upper beveled end $e^4$ will rest under a pivoted catch $f$, which is normally held down upon the end $e^4$ of the lever-arm $e$ by means of the spring $f'$, one end of which is secured to the upright frame $a^2$ and the other is secured to and serves to retract the lower end of the pivoted catch $f$, so that the upper end will be pressed down into engagement with the beveled end $e^4$ of the lever-arm $e$. The side frames $a'$ and side pieces $a^3$ are each transversely slotted, as at $h$, to form a guide for the rods $h'$, carrying the side wings $k$. The inner ends of the rods $h'$ are also guided in brackets or supports $h^2$, secured to or projecting from the floor $a$ of the fender-frame. Each of these rods $h'$ carry at their ends a hook $h^3$, adapted to engage the hook-shaped projections $d^5$ and $d^6$, respectively, of the horizontal and vertical locking-bars $d^4$ and $d$ when said bars are in locking position, and the rods $h'$ and wings $k$ are pushed inward until they rest against the side frames $a'$ and $a^3$. Between a projection $h^4$ on each of said rods $h'$ and the bracket $h^2$ and encircling the rod $h'$ is located a coiled spring $h^5$, normally adapted to throw the rods $h'$ and the side wings, $k$, outward away from the side frames $a'$ and $a^3$.

In suitable bearings $m$ on the front side of the vertical frame $a^2$ is placed a vertical shaft $n$, which, when turned, winds up the cords or chains $n'$ passing over the pulleys $n^2$ and secured to the side wings, $k$. By this means the side wings, $k$, are caused to approach the side frames $a'$ and $a^3$ against the tension of the springs $h^4$. This shaft $n$ is preferably provided with a square enlargement or head $n^3$, upon which may be fitted a handle $n^4$, adapted thereby, when rotated, to wind and unwind the shaft $n$. This shaft $n$ projects slightly above the top of the vertical frame $a^2$, so that it is readily accessible to the motorman when it is desirable to bring the wings $k$ to a locking position or engagement with the locking-bars $d^4$ and $d$.

From the extreme end of the horizontal locking-bar $d$ projects a catch $o$, formed preferably of spring-wire and adapted, when the front wing, $b$, is pushed toward the vertical frame $a^2$, to catch under a hook-shaped bracket $b'$ on the inner end of said wing $b$. The wing $b$ is normally pressed outward by means of the leaf-springs $b^2$, one end of which is secured to the frame $a$, while the other end rests against the inner edge of said wing. The catch $o$ is adapted, when caught under the hook-shaped bracket $b'$, to hold the wing $b$ in its inward position against the tension of said springs $b^2$. Over the catch $o$ projects the end $p$ of a crank-arm $p'$, rotating in suitable bearings in the frame $a$, the end $p$ being adapted, when the crank-arm $p'$ is turned, to depress said catch out of engagement with the hook $b'$ of the wing $b$. The other end, $p^2$, of said crank-arm $p'$ is connected by a cord or chain $p^3$ to the eye $d^{10}$ of the locking-bar $d$ in such manner that when the locking-bar $d$ is moved out of locking position the crank-arm $p'$ is moved and depresses the catch $o$. The end $p^2$ of the crank-arm is normally moved in an opposite direction by means of the spring $d^{11}$—that is to say, when the locking-bar $d$ is in inoperative position the crank-arm $p'$ is turned by the spring $d^{11}$, so that its end does not rest upon the catch $o$.

Extending completely around the front and sides of the fender is a cord or catch $q$, one end of which is secured to a projection of the vertical frame $a^2$, while the other end is secured to the free end of the pivoted catch $f$. This cord or chain $q$ is so arranged that it projects a distance from the side wings and front wings when the same are in locked position and is preferably at the forward end of the fender secured to the quadrant-shaped levers $q'$ in such a manner that a blow on any part of the chain or cord will be transmitted through the quadrant-levers and chain to the pivoted catch $f$, which is withdrawn thereby from contact with the beveled end of the lever-arm $e$.

Upon the framework of the fender is placed, preferably, a metallic cover-plate $r$, which may be suitably upholstered or provided with cushions $r'$. The side wings, $k$, are provided with the flexible shields or platforms $k'$, of duck, canvas, or the like, so placed or extended that when the wings are moved outward from the side frames $a'$ and $a^3$, the space between the wings $k$ and the fender is covered to prevent the fingers or other portions of the body from extending through to the ground.

Beneath the floor $a$ are placed the two curved projections $s$ adapted when the fender is in position on the car to rest slightly above the car-tracks $s'$. Between the back of the fender and the dashboard A of the car is placed one or more springs $s^2$, arranged to form a yielding bearing, so that if the curved projections $s$ strike an obstruction the fender will be moved up or down against the tension of the springs $s^2$, which thereafter serve to restore the fender to its normal position. The rear or vertical frame $a^2$ of the fender is pivotally connected, as at $t$, to an arm $t'$, adapted to slide in suitable sockets $t^2$ at the front of the dashboard A. By means of this arrangement the fender may be quickly and easily placed on or taken from the car, and when not in use it may be raised by reason of its pivotal connection to a substantially upright position.

In operation, to set the car-fender in locked position the lever-arm $e$ is pressed inward against the tension of its springs $e'$ until it is caught under the pivoted catch $f$. The locking-bars $d^4$ and $d$ are thereby forced into locking position by means of the spring $d^9$. The forward or end wing, $b$, is then pushed inward until its hook-bracket $b'$ is caught by the catch $o$ of the locking-bar $d$. The shaft $n$ is then turned by means of the handle $n^4$ and through the cords or chains $n'$ the side wings, $k$, are caused to approach the side frames $a'$ and $a^3$ against the tension of the springs $h^4$ until the hooks $h^2$ of the wings $k$ are caught by the hook-shaped projections $d^3$ and $d^6$ of respectively the horizontal and vertical locking-bars $d^3$ and $d^6$. If now in this condition an obstruction strikes the chain or cord $q$, either at the side or front of the fender, the catch $f$ will be withdrawn from contact with the lever-arm $e$, which under the tension of its springs will be instantly thrown outward toward the dashboard. The chain $e^2$ will now retract the locking-bar $d$ and elevate thereby the locking-bar $d^4$. This new position of the two locking-bars releases the hooks of the bars from the hooks of the side wings, $k$, which under tension of the springs $h^4$ will be thrown quickly outward away from the sides of the fender. At the same time the catch $o$ will be depressed by the end $p$ of the crank-arm $p'$, which crank-arm is turned by the movement of the locking-bar $d$, as hereinabove described. The hook-bracket of the wing $b$ will thus be disengaged from the catch $o$ and the wing $b$, under the influence of its springs $b^2$, will be quickly thrown outward away from the front of the fender. The wings $k$ or the wing $b$ when thus projected outward will strike against the lower limbs of any one in dangerous proximity to the car and will topple the person upon the cushioned plate $r$.

When the car is not in use—as, for instance, when it is waiting in the depot—the catch $f$ should be locked so that the side and front wings may not intentionally or unintentionally be sprung outward. To accomplish this I place at the back of the upright $a^3$, as indicated in Fig. 4, a shaft $u$, rocking in bearings $u'$ and carrying at one end an arm $u^2$, adapted when the shaft is turned in one direction to engage the free end of the catch $f$ and prevent its movement away from the lever-arm $e$. By turning this shaft and arm in the opposite direction the catch $f$ is free to be moved or sprung by the cord or chain $q$. The shaft $u$ preferably carries at its upper end a visual signal or symbol $u^3$ to inform the motorman when the catch $f$ is locked or free.

Having thus described the nature and objects of my invention, what I claim as new, and desire to secure by Letters Patent, is—

1. In a car-fender, an extensible front wing, a locking-bar sliding on the frame of the fender and adapted to lock the front wing in retracted position, a lever controlling said locking-bar, a catch controlling said lever, and a chain or cord adapted when struck to liberate said catch, said chain or cord extending at the front of the fender a distance greater than the extreme front edge of the wing in its retracted position, as and for the purposes described.

2. In a car-fender, extensible side wings, a locking-bar sliding on the frame of the fender and adapted to lock the side wings in retracted position, a lever controlling said locking-bar, a catch controlling said lever and a chain or cord projecting from the sides of the fender a distance greater than the sides of the wings in their retracted position and adapted when struck to release said catch, as and for the purposes described.

3. In a car-fender, a locking-bar sliding upon the frame of the fender, hook-shaped projections carried by said locking-bar, a lever-arm normally adapted to throw said locking-bar into inoperative position, means for locking said lever-arm and the locking-bar in locking position, side wings adapted to be moved into locking engagement with said locking-bar, and means for unlocking said lever-arm and thereby releasing the side wings from said locking-bar, substantially as and for the purposes described.

4. In a car-fender, a locking-bar sliding on the frame of the fender, a hook-shaped projection carried at the front end of the locking-bar, an extensible front wing adapted to slide in the front end of the fender-frame, means for locking said front wing in its retracted position to the hook of the locking-bar, a crank-arm adapted when turned to depress the hook of the locking-bar out of engagement with said front wing, means for retracting said locking-bar, and means controlled by said locking-bar in its retracted position for turning said crank-arm, substantially as and for the purposes described.

5. In a car-fender of the character described and provided with extensible front and side wings, a locking-bar adapted to lock the wings in retracted position, a lever controlling said locking-bar, a catch controlling said lever, a chain or cord adapted when struck to operate said catch, and a locking-shaft adapted when turned in one direction to lock said catch and prevent its operation through said chain or cord, substantially as and for the purposes described.

In testimony whereof I have hereunto set my signature in the presence of two subscribing witnesses.

ALBERT STEIERT.

Witnesses:
J. WALTER DOUGLASS,
THOMAS M. SMITH.